G. H. UNDERHILL.
PHONOGRAPH.
APPLICATION FILED APR. 29, 1911.
1,265,009.
Patented May 7, 1918.
9 SHEETS—SHEET 8.
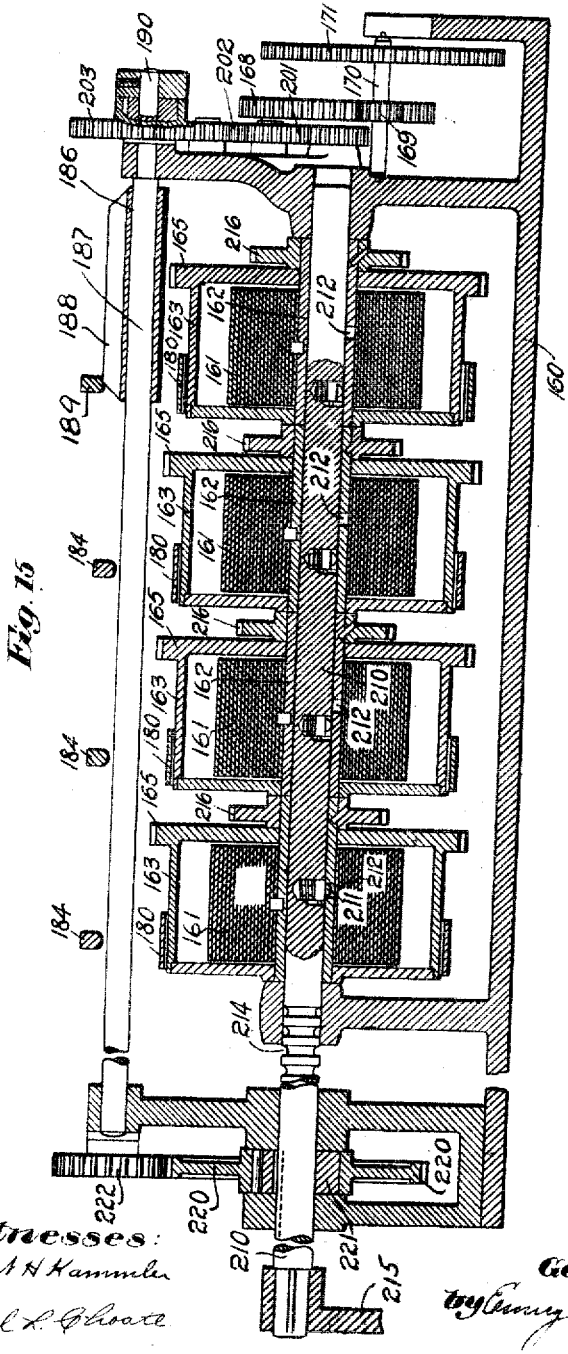
Witnesses:
Robert H Hammler
Carl L Choate
Inventor:
George H. Underhill
by [signature]
Attys

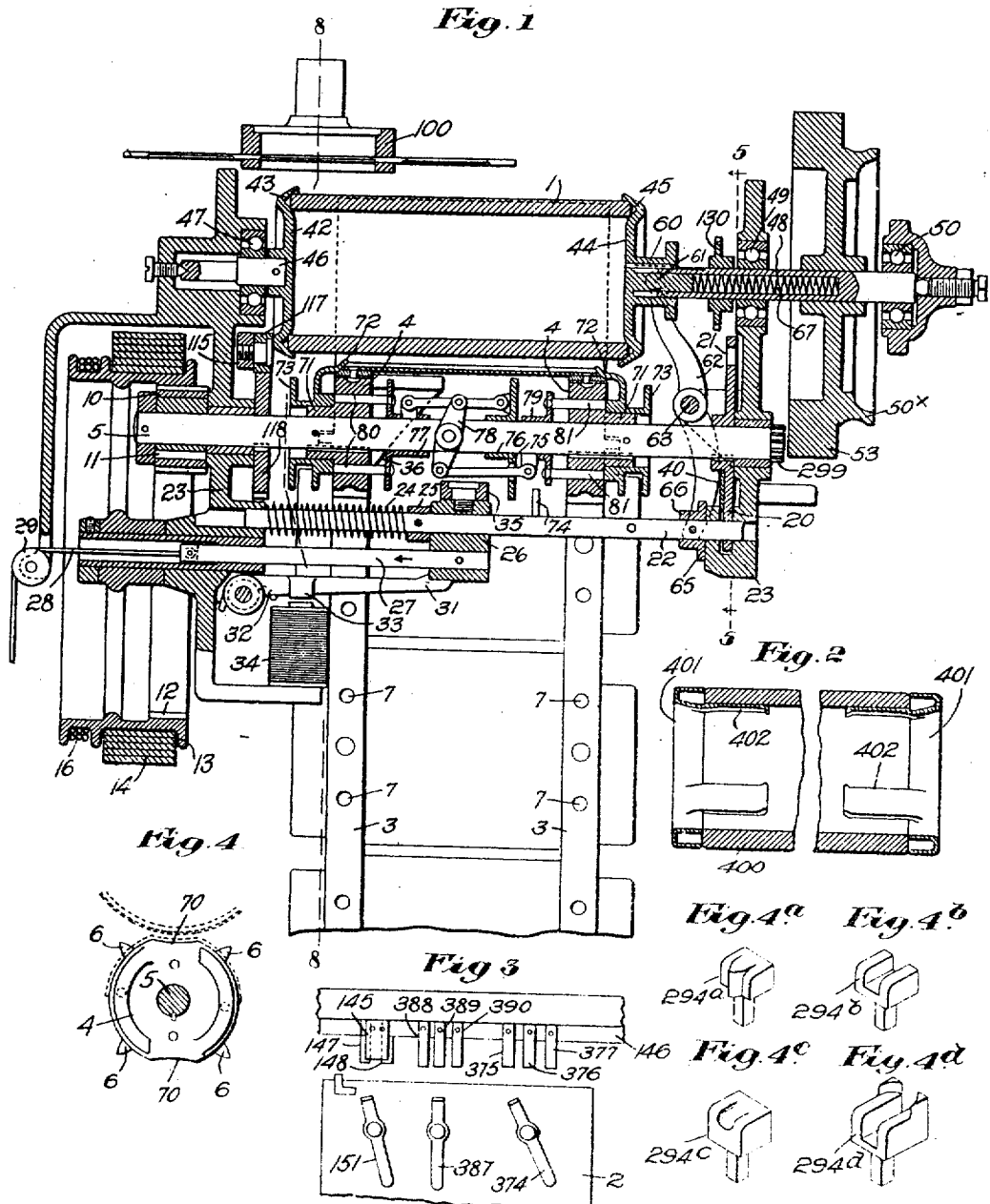

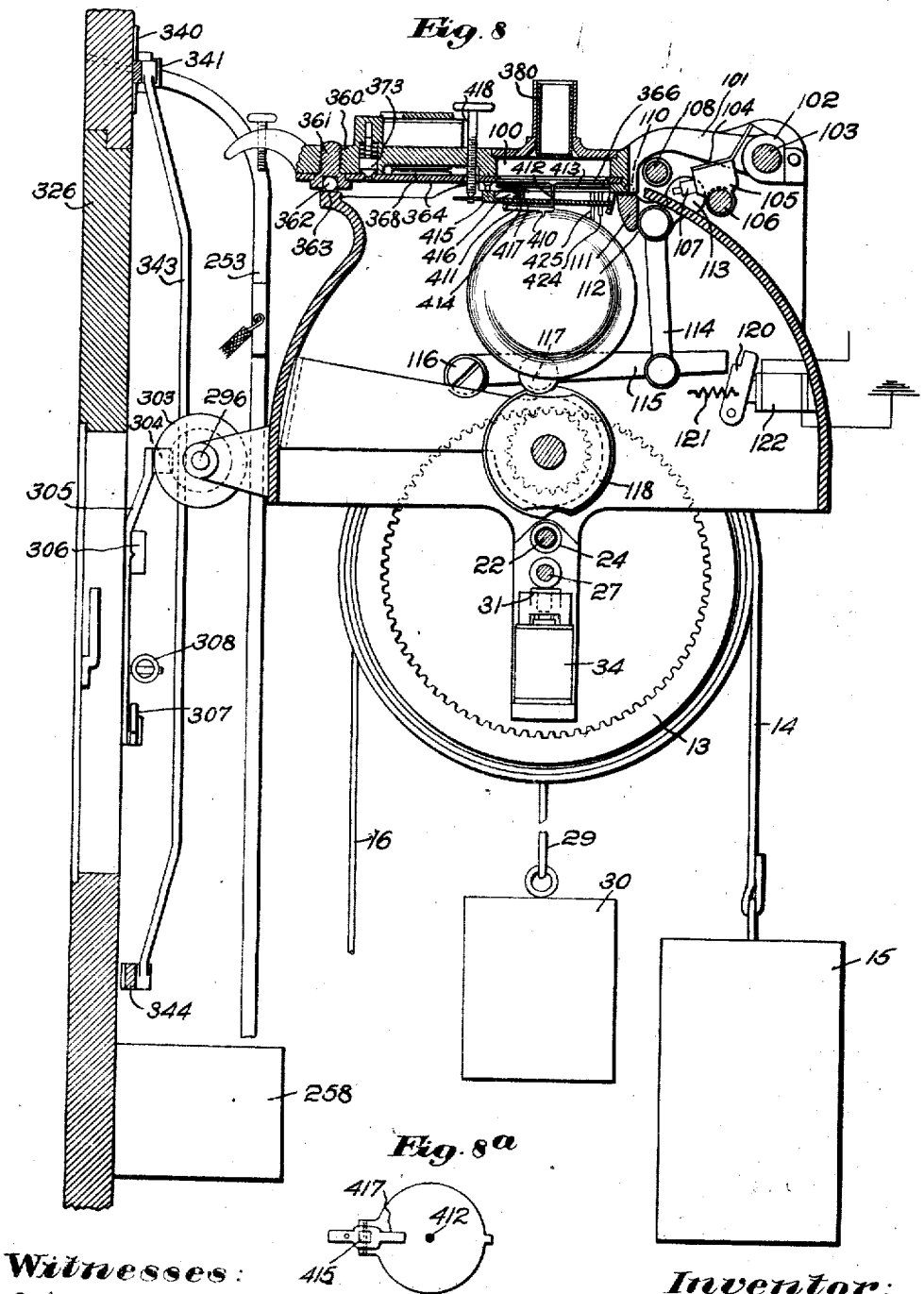

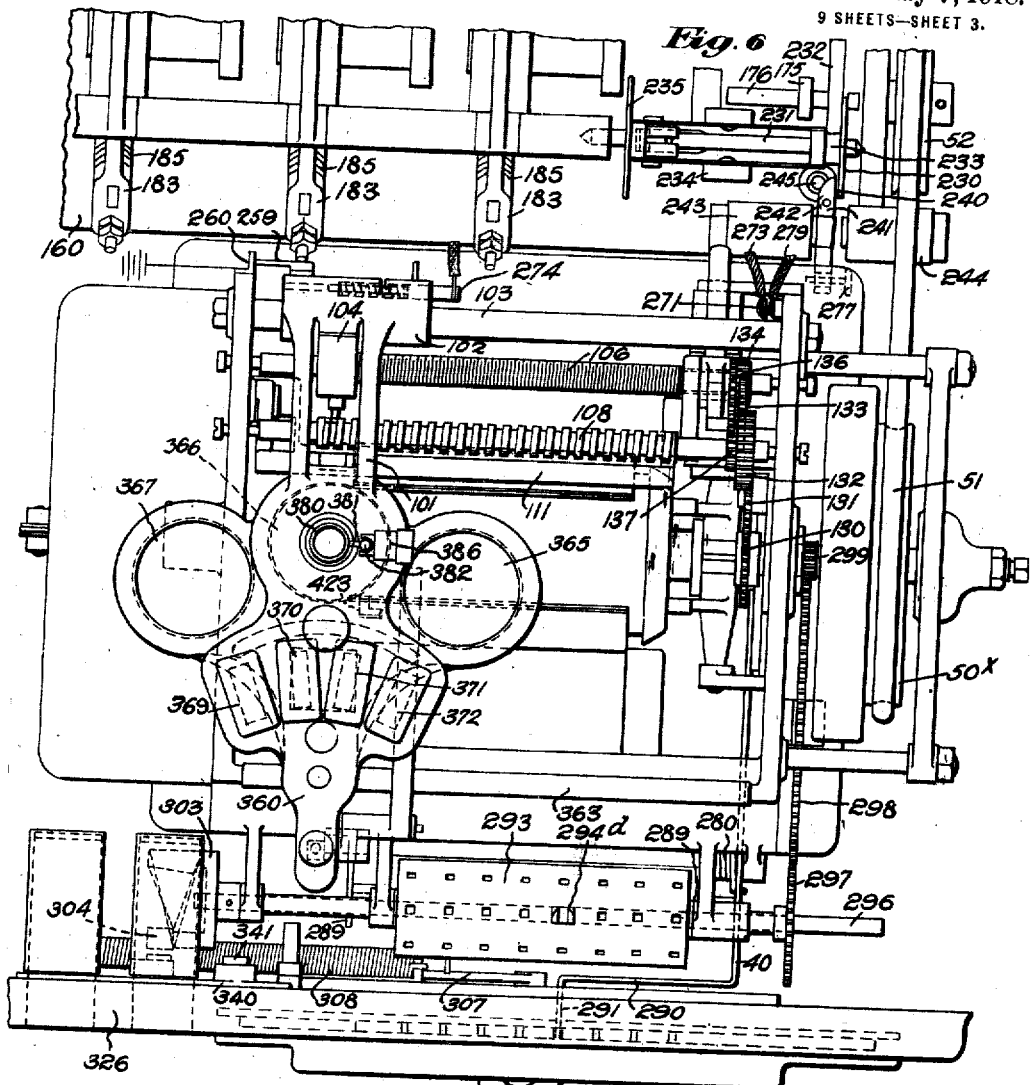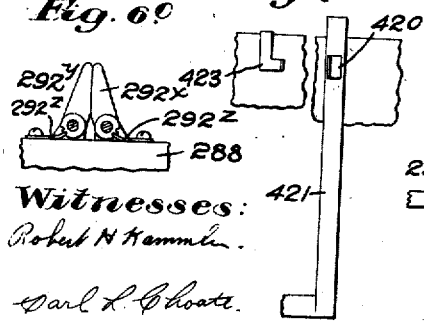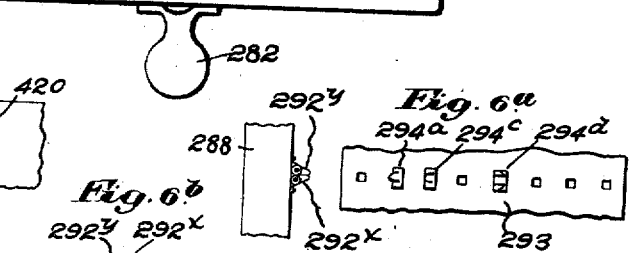

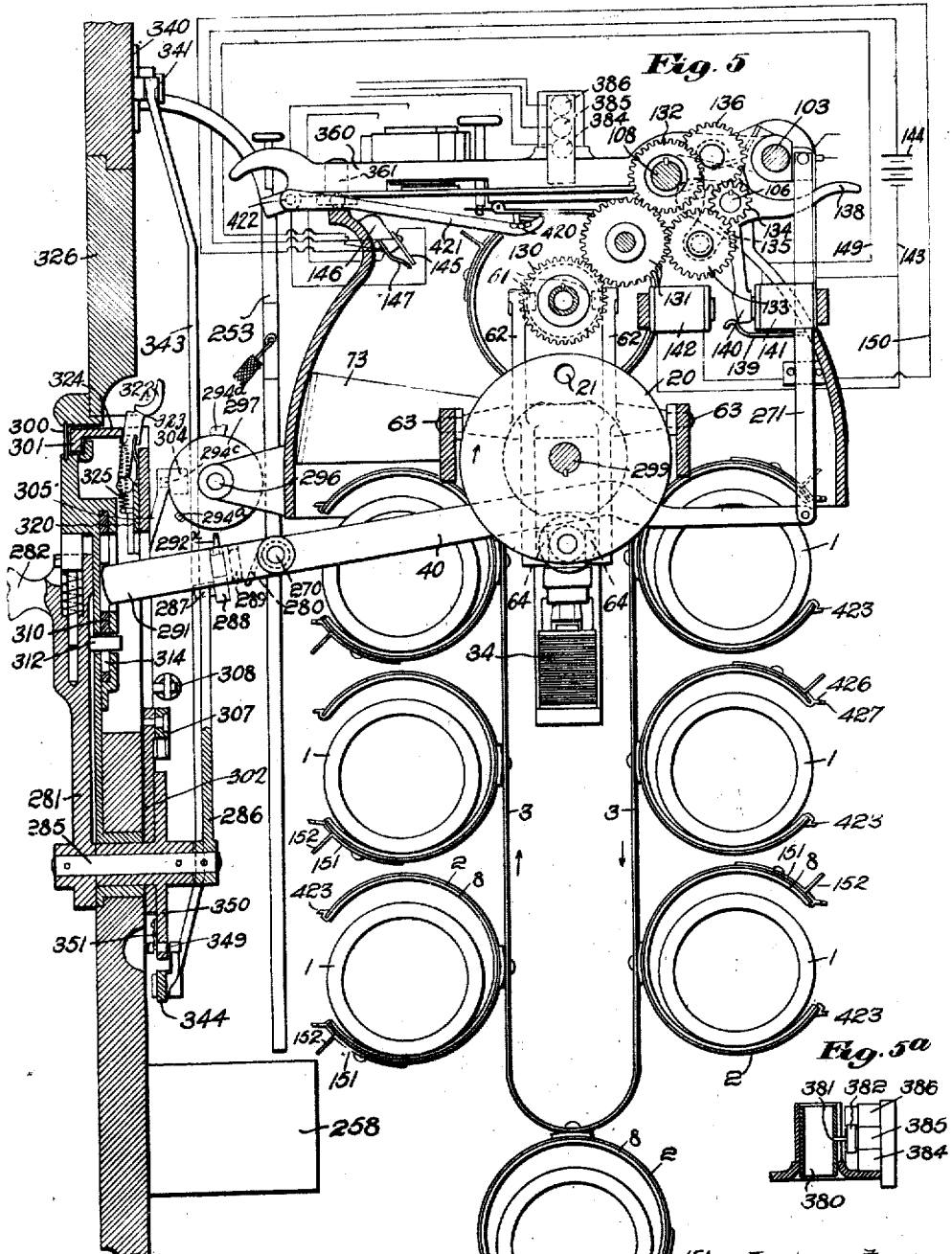

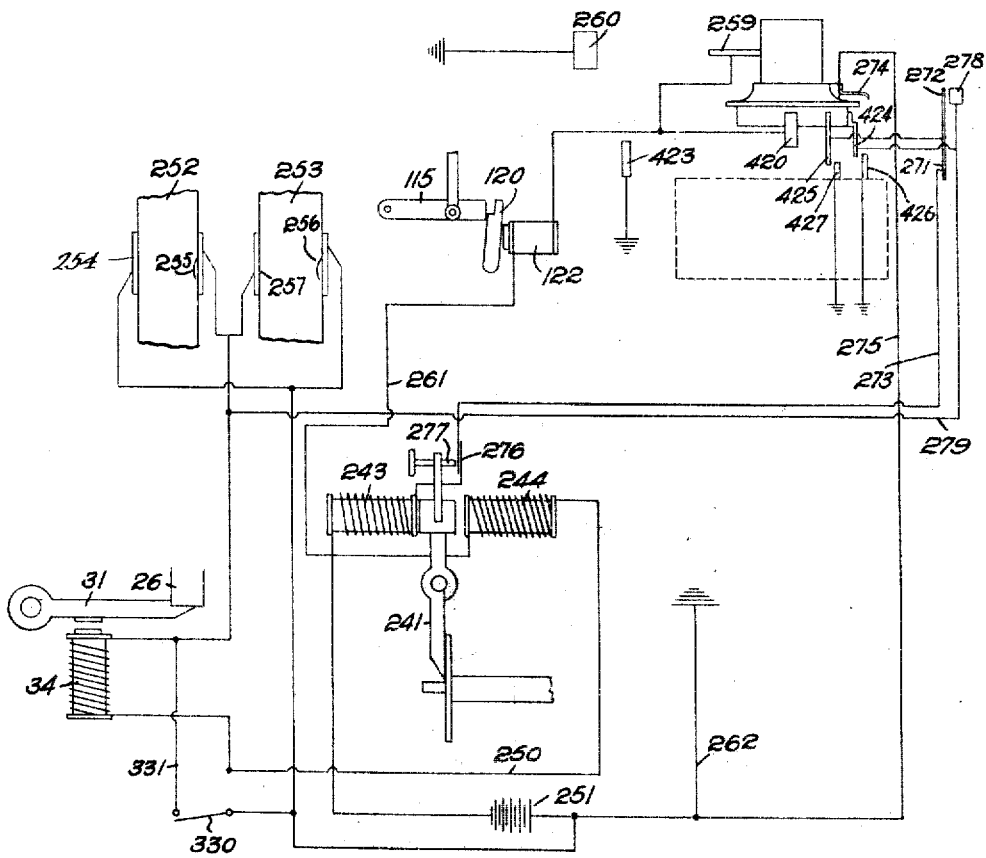
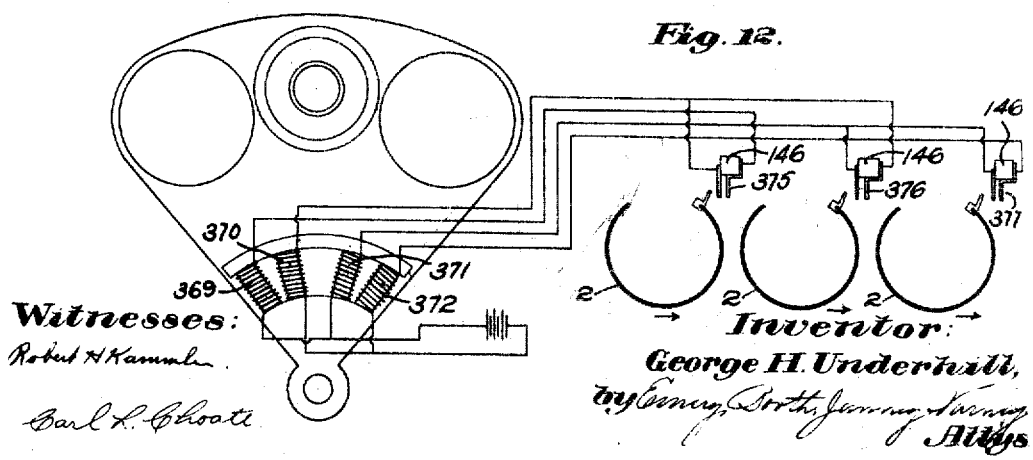

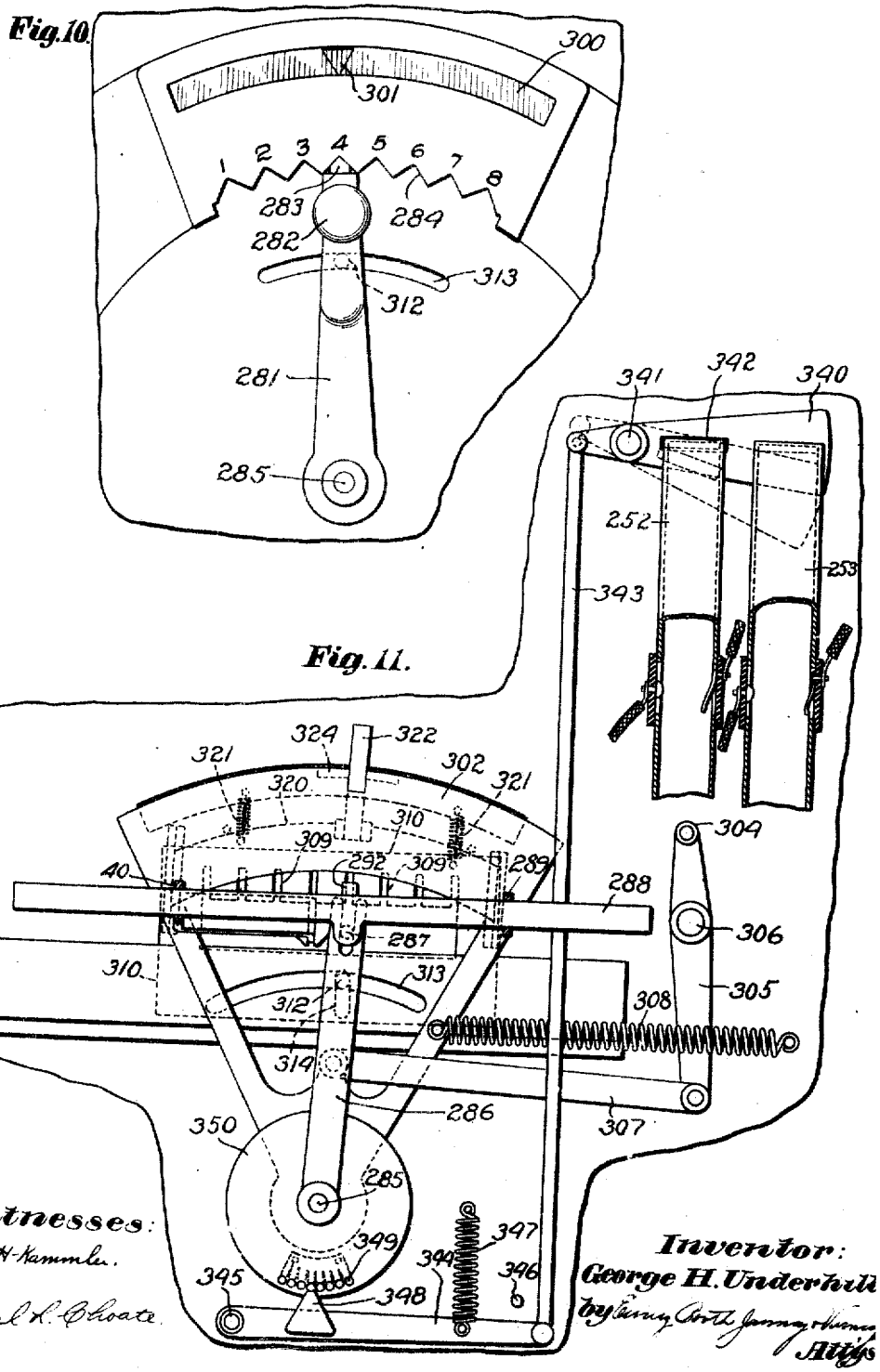

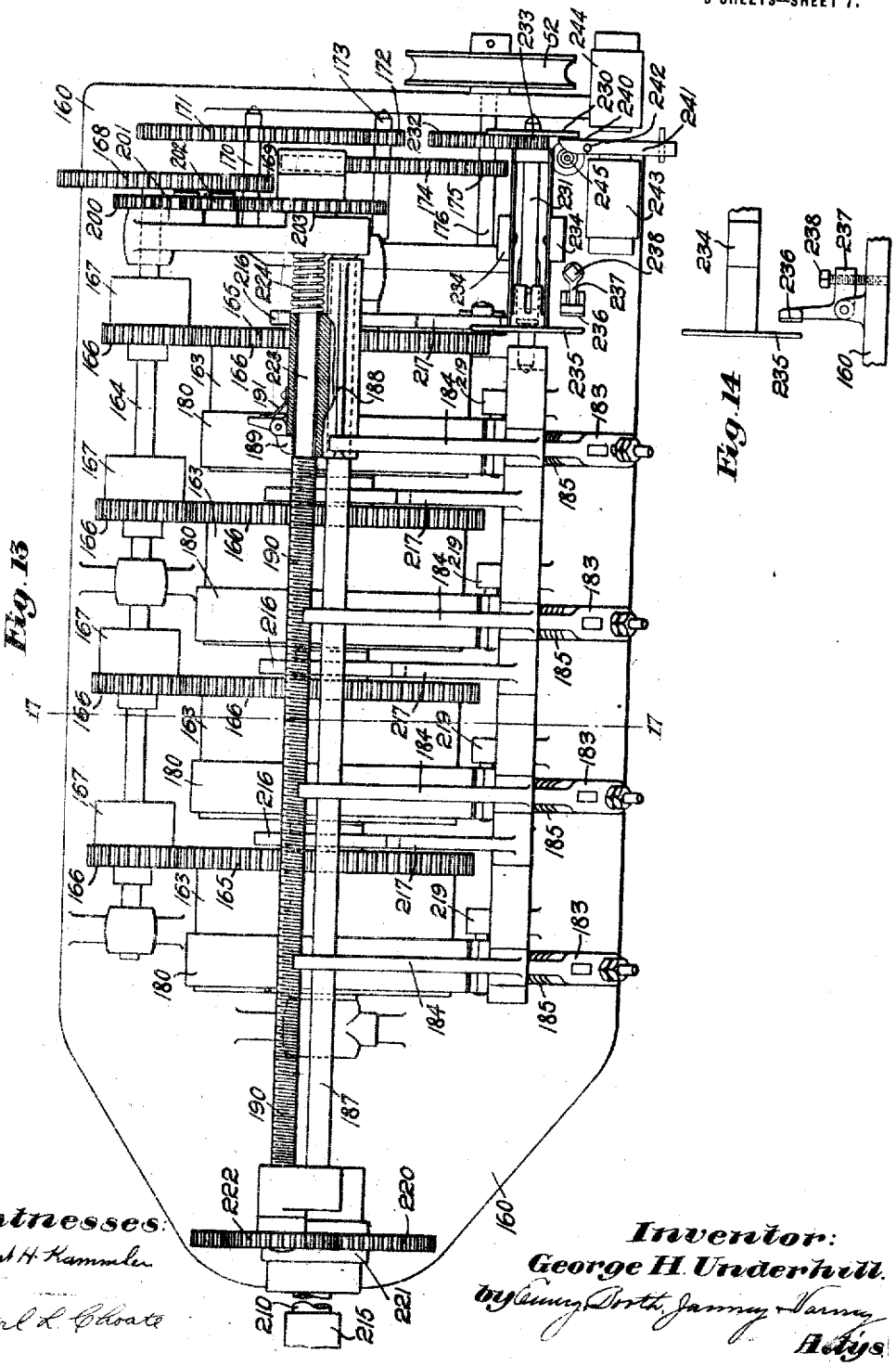

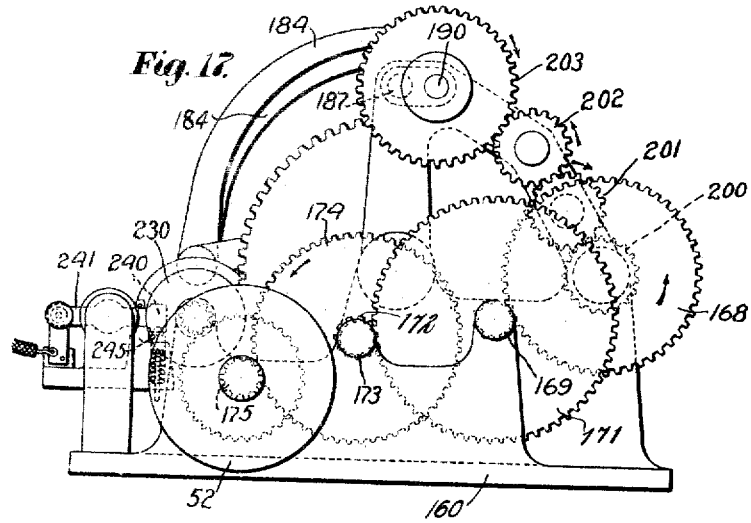
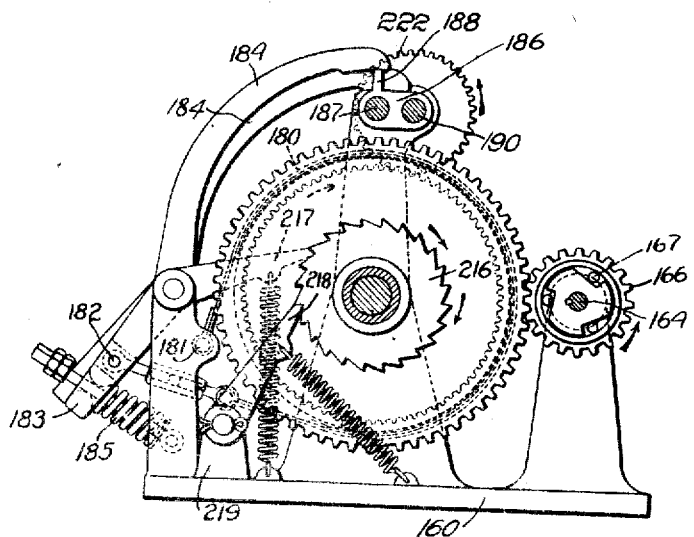

UNITED STATES PATENT OFFICE.

GEORGE H. UNDERHILL, OF BOSTON, MASSACHUSETTS.

PHONOGRAPH.

1,265,009.

Specification of Letters Patent.   Patented May 7, 1918.

Application filed April 29, 1911.   Serial No. 624,014.

*To all whom it may concern:*

Be it known that I, GEORGE H. UNDERHILL, a citizen of the United States, and a resident of Boston, county of Suffolk, State of Massachusetts, (whose post-office address is 36 Gainsboro street, Boston, Mass.,) have invented an Improvement in Phonographs, of which the following description, in connection with the accompanying drawings, is a specification, like characters on the drawings representing like parts.

This invention consists in improvements in phonographs. Many of its features have useful application to various different types of such machines including sound recording machines, but my invention in the main is particularly applicable and is herein illustrated with reference to one type of multiple record machine employing a plurality of cylindrical records so held as to be automatically and successively brought into reproducing or recording relation to suitable reproducing or recording mechanism, the latter being caused to automatically traverse the face of each record as the same is presented.

My invention will be best understood by reference to the following description when taken in connection with the accompanying illustration of one specific embodiment thereof, while its scope will be more particularly pointed out in the appended claims.

In the drawings:

Figure 1 is a central sectional elevation of a portion of a sound reproducing machine embodying one form of the invention;

Fig. 2 is a sectional elevation partly broken away showing a record adapter;

Fig. 3 is a view showing the relation of the controlling contacts on the carrier and the frame;

Fig. 4 is an end sectional elevation of a carrier sprocket wheel;

Figs. 4ª, 4ᵇ, 4ᶜ and 4ᵈ show in perspective different forms of pins for the pattern or controlling drum;

Fig. 5 is a transverse sectional elevation of the same machine taken on the line 5—5 in Fig. 1;

Fig. 5ª is a section in elevation through the sound tube.

Fig. 6 is a plan view of the machine shown in Fig. 1 partly broken away;

Fig. 6ª is a development of the section of the pattern drum showing the pins and their relation to the stop pin for the stop bar;

Figs. 6ᵇ and 6ᶜ show in detail the elevation and plan respectively of the stop member;

Fig. 7 shows the relation of the contacts which control the selection of the sound box diaphragm;

Fig. 8 is an end elevation partly in section taken on the line 8—8 in Fig. 1.

Fig. 8ª is a plan view showing the stylus lever;

Fig. 9 is a diagram of the electric controlling circuit and connections;

Fig. 10 is a front elevation of the designating lever and indicator;

Fig. 11 is a rear elevation of the coin chutes and the parts connected to the designating lever and indicator;

Fig. 12 is a view partly diagrammatic showing the relation of the contacts controlling the shifting of the sound box diaphragm;

Fig. 13 is a plan view of the driving motor employed for the reproducing machine;

Fig. 14 is a detail in elevation showing the governing disk and brake shoe for the motor.

Fig. 15 is a central sectional elevation of the motor;

Fig. 15ª is a section through the winding shaft illustrating the clutch for a springwinding sleeve;

Fig. 16 is a sectional detail in plan taken through the positioning bar for the motor shaft;

Fig. 17 is an end elevation of the driving motor; and

Fig. 18 is a sectional elevation on the line 17—17 of Fig. 13.

In the drawings for illustrative purposes, the various features of the invention are shown embodied in a multiple record phonograph where a series of record cylinders 1 are held in a flexible carrier and conveyed one by one to reproducing devices, suitable apparatus being provided for designating a certain particular record or records to be played and for causing the automatic playing of such record or records and the subsequent automatic stoppage of the machine when the designated records are played.

While I have illustrated my invention as applied to a machine of this type, it is to be understood that as to many features it is applicable to single record machines and to machines employing records other than cylindrical records, and to multiple machines of widely different types.

Referring to the drawings, and particularly to Figs. 1 and 5, the records 1 are carried in their holder without the employment of mandrels but each rests loosely in a retainer 2, the latter being preferably in the form of an open-ended tube of greater diameter than the record and having a slot or opening lengthwise the same to permit the engagement of the sound reproducing mechanism with the record while still contained within the retainer. Each retainer may be constructed of steel tubing sawed to proper lengths and cut away to provide the slot or it may be stamped or bent out of sheet metal.

The retainers are assembled in the form of a flexible carrier in any suitable way, as by being riveted or otherwise secured, at opposite ends to a flexible band or tape 3, the two tapes passing over sprocket wheels 4, the latter keyed to the carrier driving shaft 5. The sprocket wheels (see Fig. 4) are provided each with four teeth 6 which register with suitably arranged perforations 7 so located that rotation of the shaft brings the record retainers successively in position vertically above the sprockets and in appropriate relation to sound reproducing mechanism.

Each retainer is preferably lined with strips 8 of felt which prevent injury to the records during the travel of the carrier, and the dimensions of the retainers and the slot therein are such that in all positions of the retainers the records are carried thereby without injury and without excessive displacement as the carrier changes position while leaving the record sufficiently free or loose therein for purposes subsequently to be described.

Means are provided to impart a constant turning effort to the carrier driving shaft but the latter is normally locked against turning movement and is released through the operation of appropriate controlling devices when it is desired to shift to the next successive or to another record. To turn the shaft, the latter is provided at the end with a driving pinion 10 which has a roller clutch connection 11 to the shaft and is driven by the internal gear 12 on the pulley 13. The latter has wound thereon the band 14 connected (Fig. 8) to the weight 15, the latter tending constantly to turn the pulley and therefore the driving shaft and gears in the direction indicated by the arrow in Fig. 5. The pulley 13 has a second grooved portion on which is wound the winding cord 16 wound reversely to the band 14 so that as the weight drops the cord winds on. The cord passes to some convenient point (not shown) exterior to the case of a machine so that it can be pulled out and the weight wound up from time to time as may be required. The roller clutch connection 11 between the pinion 10 and the shaft 5, permits this winding movement without movement of the shaft or carrier. While a winding cord is herein shown for the purpose of winding up the weight, obviously any suitable means may be employed for that purpose or for maintaining a constant turning effort on the sprocket shaft.

Referring now to the carrier locking and releasing mechanism, the carrier shaft 5 has fixed at its opposite end a locking disk 20 provided with two diametrically opposite perforations 21. When a record retainer has been brought by the sprocket into correct position for playing the record, one of these perforations is brought into registration with a sliding locking bolt 22 and, if not prevented by devices to be later described, the locking bolt will enter such perforation and hold the disk, and therefore the sprockets and carrier, in fixed position. The locking bolt also slides through an adjacent portion of the machine frame 23 so as to hold the disk rigidly against movement.

The locking bolt is normally forced toward the locking disk by means of a spiral spring 24 interposed between the frame 23 and a collar 25 pinned to the bolt.

To release the carrier the locking bolt is moved back and the spring 24 compressed by means of a sliding actuator sleeve 26 which slides on the bolt and abuts against the collar 25, such actuator being constantly drawn toward an unlocking position (to the left in Fig. 1) by means of a slide rod 27, the latter fastened to the cord 28 passing over the pulley 29 and secured to the weight 30 (Fig. 8).

The movements provided for locking and unlocking the carrier are as follows: When the carrier is locked the actuator 26 is normally held in an inoperative position by means of the latch 31 pivoted on the frame, which latch is constantly pressed into engagement with the edge of the actuator sleeve by means of the spring 32. The latch carries an armature 33 operatively disposed with relation to the carrier releasing magnet 34, the latter energized through electrical connections to be later described. At the appropriate time the magnet 34 is energized, attracting the armature and releasing the actuator which is drawn to the left by means of the weight 30. This withdraws the locking bolt from the locking disk and releases the carrier to permit advancing movement thereof, which immediately takes place. The actuator, in moving to the left, brings a cam roll 35, carried thereby, into operative relation to an edge cam 36 carried by the adjacent sprocket wheel 4. As the sprocket turns to move the carrier, its edge cam engages the actuator and forces the latter back leaving it finally in a position where the latch slips over its edge and prevents subsequent return movement irrespective of further movement of the sprocket until the carrier releasing magnet is again energized.

As the actuator is moved back to inoperative position, the spring 24 causes the locking bolt collar 25 to follow it up until the end of the locking bolt meets the face of the locking disk or the face of a main controlling lever 40 (Figs. 1 and 5) which is adapted to oscillate across the face of the disk and in the path of the locking bolt. The complete function of this lever will be referred to later. If the controlling lever 40 is raised, as shown in Fig. 1, leaving the locking bolt free to enter the perforation 21 of the locking disk, as soon as the carrier turns sufficiently to bring such perforation within the path of the bolt, the latter will enter the same and stop further movement of the carrier. If the controlling lever, however, has been depressed to cover one of the perforations of the locking disk the locking bolt will be prevented from entering the same and the carrier will continue to turn until the controlling lever has been raised to permit the locking bolt to enter the next perforation crossing its path.

Referring now to the devices for engaging the record which is to be played and for rotating it in operative relation to the sound reproducing mechanism, there are provided means, herein a pair of grooved disks, which engage directly with the end walls of the record shell and rotate the same, the record being freed from its retainer to permit such rotation either by depressing the carrier or by lifting the record through the action of the rotating devices or other means, or preferably by the combined depression of the carrier and lifting of the record.

Referring to Fig. 1, there are shown two record engaging devices comprising the rotatable disk 42 having an annular groove 43 adapted to receive one end of the record shell and the opposite companion disk 44 having the annular groove 45 adapted to engage the opposite end of the record shell. The disk 42 is secured to a short shaft 46 adapted to turn freely in the ball bearings 47, there being herein no provision for axial movement of the said disk. The disk 44, however, is mounted to slide axially upon a tubular shaft 48 the latter mounted to turn in ball bearings 49 and 50. The disk 44 acts as the driving member for the record being keyed to the shaft 48 which in turn is driven by the driving pulley $50^x$ connected by means of the spring belt 51 (Fig. 6) to the driving pulley 52 of any suitable motive device. Preferably there is also provided a fly wheel 53 herein forming a part of the pulley $50^x$ so as to steady the speed of the record rotating mechanism.

When a record is positioned by the carrier for playing, the driving disk 44 is moved to engage the same and force the opposite end of the record into its seat upon the opposite disk 42, the record then being held clamped between the two disks which are driven at the required rate of speed through the driving mechanism described. After the record has been played, the driving disk 44 is moved back to release the record and restore it to the carrier, the record in sliding off from the beveled edges of the fixedly positioned disk 42 being given a sufficient lateral movement to clear the said disk.

To impart the appropriate record engaging and disengaging movements to the disk 44, the latter is provided with a grooved portion 60, which is engaged by the pins 61 (see Fig. 5) carried by the forked lever 62 pivoted at 63 upon the frame, the opposite or lower arms of the lever carrying lugs 64 which contact with the shoulder 65 (Fig. 1) of a sleeve 66 pinned to the locking bar 22.

The disk 44 being slidable upon the tubular shaft 48 the locking bar 22, acting through the lever 62, moves the disk back out of the path of, or engagement with, the record shells during all such times as the locking bolt is held back from entrance into one of the locking disk perforations 21.

When, however, the locking bolt is permitted to enter such perforation, which occurs only when the record carrier has positioned a record shell in substantial alinement with the end engaging devices, movement of the locking bolt into its locking position throws the lever 62 about its pivot, releases the driving disk and permits a coiled spring 67 contained within the tubular shaft to throw the driving disk to the left and grip or engage the adjacent end of the record shell.

When the carrier is unlocked by any unlocking movement of the bolt 22, this acts through the lever 62 to throw the disk 44 to the right, cleasing the record and restoring it to the carrier.

Herein the record is free for rotation from the carrier, both by withdrawing the carrier itself and slightly lifting the record. A sufficient lifting of the record is had by the inclined shape of the edges of the end engaging disk which wedge the record shell slightly upward. Simultaneously with the slight lift which is given the record by the means described, freeing of the record is further insured by movement of the carrier in an opposite direction through depressing devices as follows: Referring to Fig. 4, it will be seen that the sprockets 4 are not perfect cylinders but have diametrically opposite depressions 70, one of which comes beneath the record retainer when playing position is reached by the carrier. The movement of the carrier locking devices which cause engagement of the record by the record rotating means, also simultaneously releases gripping devices which move in and grip the flexible carrier and press the same into the depressions 70 upon the sprockets so that that portion of the carrier immediately below the record is depressed into the position represented in Fig. 4, thereby insuring rotation of the record free from any contact with the carrier.

Referring to Fig. 1, the gripping devices comprise sleeve members 71 slidably mounted one upon each hub of the sprocket wheel and provided each with a suitably formed lip 72 which, when the gripper is moved in toward the sprocket wheel, is adapted to overlie and engage the edge of the carrier and wedge and depress the same into the underlying depression 70 of the sprocket. These grippers are secured to or carried by spring members 73, the opposite ends of which are fixed to the frame and so arranged that they continually press the grippers in toward the sprockets with sufficient force to depress the carrier when the latter is engaged thereby.

The grippers are held back or away from the sprocket except when the latter is locked in fixed playing position but are released at the appropriate time by devices controlled by the locking bolt.

To open the grippers simultaneously with the unlocking of the carrier, the locking bolt 22 carries a pin 74 which, when the bolt is released by the latch 31, strikes against a disk 75 carried by a sleeve 76 slidably mounted on the carrier driving shaft. The sleeve 76 has a link connection to a second sleeve 77 and also to a lever 78 pivoted on the shaft which, in turn, has a link connection to a third sleeve 79. The connections are such that when the locking bolt moves to the left (Fig. 1), it carries the sleeve 76 with it, moving both sleeves 77 and 79 outwardly or in opposite directions. The sleeve 77 is provided with pins 80 and the sleeve 79 with pins 81, each set of which slide through perforations in the adjacent sprocket wheel and are adapted to force and hold the grippers 71 away from the sprocket and out of engagement and out of the path of the carrier. So long as the locking bolt is held in an unlocking position, it holds the grippers out of the way of the carrier. As soon, however, as it moves to its locking position, it releases the grippers and they move into a position to grip and lock the carrier and the sprockets.

While herein providing for a movement both of the carrier and the record to insure the freeing of the latter from the carrier as previously stated, either movement might be solely relied upon to free the same.

To provide for the automatic travel and return of the reproducing mechanism, provision is made for lifting the sound box and the stylus free from the record simultaneously with the unlocking of the carrier and the initiation of its shifting movement, the sound box being then returned to its initial position and the stylus allowed to engage with the new record as soon as the latter has been brought into playing position.

The sound box 100 is carried by the arm 101, to overhang the record which is in playing position, the arm 101 being carried by the sleeve 102, the latter slidably mounted upon the guide bar 103. The sleeve 102 carries an arm 104 (Fig. 8) provided with the nut 105 which when the sound box is depressed, engages with the feed screw 106. This causes the advance of the sound box at a relatively slow speed during the playing of the record.

The arm 104 also carries a second nut or other member 107 suitable for engaging with the coarse threaded return screw 108 when the reproducer arm is lifted, such lifting movement serving to disengage the nut 105 from the feed screw 106.

To lift the reproducer arm the latter is provided with a ball support 110 mounted to travel along a rail 111, which rail is carried by arms 112 fulcrumed at 113 on the machine frame. One of the arms is connected to a link 114, the latter joined to the lever 115 pivoted at 116 to the frame. The lever 116 carries a cam roll 117 which rests against the edge of a cam 118 keyed to the carrier driving shaft 5. The cam 118 (Fig. 8) is provided with two diametrically opposite depressions so positioned that when the carrier has brought a record to operative position the cam roll will register with one of the said depressions and, except when prevented by devices to be referred to, will allow the lever 115 to descend dropping the rail 111 and bringing the stylus against the record to engage with the groove thereof. In all other positions of the carrier, however, the cam 118 holds the lever 115 up so as to raise the reproducer and hold the stylus away from the record.

The moment that the carrier is unlocked and commences to move, the cam lifts the cam roll and lever and therefore the rail 111 and the stylus and initiates the return movement by causing engagement between the return screw 108 and the nut member 107. It will, therefore, be seen that the unlocking of the carrier not only releases the record and starts the shifting movement of the carrier, but also raises the reproducer and starts its return movement. Furthermore, when the carrier has brought the selected record into playing position, it is automatically locked and the sound box automatically lowered to bring the stylus into engagement with the record, the record being simultaneously seized by the rotating devices, whereupon its reproduction immediately commences, and continues until the record is played.

In order to prevent the stylus from being lowered into engagement with the record before it has been restored to its initial position, a latch 120 (Fig. 8) is preferably provided normally held in engagement with the end of the lever 115 by means of a spring 121 so as to prevent the lowering of the lever and of the stylus except when such latch is retracted by means of the magnet 122. Provision is made, as will hereinafter appear, whereby the magnet 122 is only energized when the sound box is at its initial position and the selected record is in place which it is intended to play.

Referring now to the driving mechanism for the feed and return screws, the latter is driven at a relatively high rate of speed from the tubular record driving shaft 48 by means of the gear 130 fixed on the said shaft and meshing with the intermediate gear 131, the latter driving the broad faced gear 132 upon the return screw 108.

The feed screw 106 may be driven at any one of a plurality of speeds to suit different speed requirements for different records. That is to say, certain records may be required to be played in two minutes and for these the stylus can be traversed at a relatively high rate of speed; other records of the same cylinder length may be required to be played in three, four or five minutes, and for these the stylus can be traversed at a relatively low rate of speed.

As illustrative of such speed change mechanism for the feed screw, I have herein shown speed change gears as follows: For the rapid rate of stylus travel, the gear 132 is caused to mesh with an intermediate gear 133 and the latter meshes directly with the feed gear 134 fixed upon the feed screw 106. The intermediate gear 133, however, is journaled upon a swinging frame or bracket 135 pivoted upon the feed screw 106 and upon another arm of such bracket is journaled a second intermediate gear 136 also meshing with the feed gear 134 but adapted to be thrown into engagement with a gear 137 keyed to the return screw 108 and of smaller diameter than the gear 132. The bracket 135 may be swung to a position to engage the gears 136 and 137 for the slow speed of the feed screw, or to a position to engage the gears 132 and 133 for the high speed of the feed screw.

To change from one speed to the other, the bracket is provided with a projecting finger piece 138 by which it may be moved to either position, a spring 139 engaging a finger 140 depending from the bracket and serving to hold the bracket in either position in which it is placed. In addition to this manual means for adjusting the speed, the speed may be changed automatically and, if desired, with reference to the peculiar requirements of the record in any given case. For changing the speed automatically to suit the speed requirements of the different records, the finger 140 carries an armature operatively related to the two electro-magnets 141 and 142, by the energization of the appropriate one of which the speed change gear may be shifted.

The controlling circuits for these magnets are shown semi-diagrammatically in Figs. 3 and 5. The two magnets have a common battery circuit 143 connected to the battery or other suitable source of electro-motive force 144. The battery wire 143 leads from the battery (see Fig. 5) to a broad contact piece 145 located on the upper side of an insulated rail 146 (see Fig. 5), the latter carried by a fixed part of the frame and adjacent to the path of travel of the record retainers. Underlying the battery contact 145 are two contacts 147 and 148 connected respectively through the wires 149 and 150 with the magnets 141 and 142.

Each record retainer (see Figs. 3 and 5) is provided with a pivoted adjustable clip 151 having a projecting end 152 which, just before the record retainer reaches playing position, is adapted to strike one or the other of the two magnet contacts 147 and 148 according to the position to which the clip has been adjusted about its pivot and cause it to touch the battery contact 145. If it is adjusted to engage with the magnet contact 147, the magnet 141 will be energized and a slow feed for the stylus insured. If the contact 148 is closed the higher rate of stylus travel will result.

By variously adjusting the stylus controlling clips 151 on successive record retainers to conform to the speed requirements of the individual records contained therein, the speed change gears will be so positioned as each record approaches its operative position as to provide for a rate of travel of stylus appropriate for the particular record then coming into playing position.

While I have herein shown a speed change mechanism designed to provide either one of two speeds for the travel of the stylus, it is obvious that additional speed changes might be employed where conditions arise to render it desirable, and that additional speed changes might be automatically had by means similar to those herein described.

Referring now to the motive means for driving the record rotating devices, I have provided an improved form of motor comprising a plurality of individual units adapted to be brought successively into operative relation to the driving mechanism.

In the described embodiment of the invention such motor is a spring motor wherein a plurality of spring-actuated devices are so employed as to permit each spring unit to be utilized under conditions of greatest efficiency and permitting, furthermore, the construction of a spring motor of great capacity within a comparatively small compass.

Referring to the drawings and particularly to Figs. 13 to 18, inclusive, the motor is mounted upon a base 160 and comprises a series of flat coiled springs 161, herein four in number, connected each at its inner end to a tubular winding sleeve 162 and at its opposite end to a drum 163. Any one of the four drums when released for unwinding drives a countershaft 164 through the drum-attached gear 165 which meshes with the gear 166, the latter connected to drive the countershaft 164 through the roller clutch device 167 (Fig. 18). The latter imparts driving movement from the associated gear 166 to the countershaft, but permits the countershaft to be turned from another spring drum 163 without affecting the position of the first-mentioned gear 166.

To impart driving movement from the countershaft 164 to the driving pulley 52, the former carries at its end the driving gear 168 meshing with the pinion 169 on the intermediate shaft 170. The latter carries the large gear 171 meshing with the pinion 172 on the second intermediate shaft 173, which latter carries the large gear 174. The gear 174 in turn meshes with the small pinion 175 mounted on the shaft 176 which carries the driving pulley 52. By these means a turning movement of the countershaft 164 is transmitted to the pulley 52 at greatly increased speed ratio.

Referring now to the devices for bringing into operation successive motor units, each drum is normally held from rotation by means of a brake band 180, such band being fixed at 181 and connected at 182 to an arm 183 of the brake releasing lever 184. A spring 185 normally holds the brake applied, but it may be released to drive the record rotating shaft by the sliding, releasing sleeve 186. The latter is mounted to slide along a fixed guide rod 187 and has a rib or fin 188 (see Fig. 15) which passes beneath the levers 184 in succession and lifts them one after another to release the attached brake and apply the spring for driving the motor. The releasing sleeve carries a nut member 189 (Fig. 13) pivoted on the sleeve so that it can be thrown into or out of engagement with the feed screw 190, the nut member being normally pressed into engagement with the screw by the spring 191.

During the operation of the machine the feed screw 190 is turned by the countershaft 164 at a speed and in a direction suitable for feeding the releasing sleeve from right to left as viewed in Fig. 13 through gearing shown in Figs. 13 and 17. Fast upon the countershaft is a gear 200 meshing with an intermediate gear 201 and the latter with a second intermediate gear 202. The gear 202 drives the gear 203 fast upon the feed screw 190.

Provision is made for winding up the successive spring units as follows: Each spring winding sleeve 162 is adapted to be separately connected to the spring winding shaft 210 by means of spring-pressed detents 211 (Fig. 15) carried by said shaft and adapted to be brought one by one into a position to snap into openings 212 arranged one in each of the spring winding sleeves. The head of the detent is rounded lengthwise the sleeve, but has a straight face circumferentially the sleeve (see Fig. 15ª) so that, while the shaft can be slid axially so as to bring the detents successively into engagement with their respective sleeves, it locks the shaft to the sleeve for rotative purposes.

The shaft, when slid from one position to another, is definitely positioned by means of a spring-pressed ball 213 (Fig. 16) which snaps into one of a series of grooves 214 formed in the periphery of the shaft 210. At the end of the shaft exterior to the casing there is fixed thereon a suitable handle, a portion of which is shown at 215 (Fig. 15) whereby the motor may be wound up at will from time to time. In winding the motor the shaft is first brought into rotative engagement with the first spring of the series and such spring wound up tightly. It is then brought into engagement with a second spring and so on until all springs have been tightly wound up. The unwinding movement of each drum is prevented by means of a ratchet 216 secured thereto, such ratchet being engaged by a spring-pressed pawl 217 pivoted coaxially with the releasing lever 184, the end ratchet (right hand in Fig. 13) of the series having a locking pawl 218 pivoted on a lug 219 on the bed plate.

When the winding shaft 210 is turned to wind up the springs the feed screw is reversely turned to move the releasing sleeve back to its initial position. This movement is secured by providing a gear 220 connected to be turned by the winding shaft through a roll clutch member 221, the gear meshing with a smaller gear 222 on the end of the feed screw 190. This transmits reverse movement to the feed screw when the winding shaft is turned in a direction to wind up the springs but does not turn the feed screw if the shaft is turned in the opposite direction, nor does the opposite or feeding rotation of the feed screw tend to turn the winding shaft by reason of the interposed roll clutch device.

The initial end of the feed screw is provided with an unthreaded portion 223 so that when the releasing sleeve reaches the same further retrograde movement ceases. A spring 224 is interposed between the sleeve and the frame to press the nut member 189 initially against the threaded portion of the screw, so that the moment the feeding movement of the screw begins the release sleeve also begins its movement.

Preferably the parts are so adjusted that the releasing member is returned to its initial position before the last spring has been completely wound up and preferably it completes its traverse beneath the releasing lever of each spring unit before its spring is completely unwound. This provides for working each spring unit between a limit of maximum compression and a lower limit which may also represent relatively high compression as compared with the complete unwinding of the spring. The utilization of these successive spring units each working between limits which provide for maximum efficiency supplies a very effective spring motor in that the records all tend to be driven under an impelling force having very slight variations. It also provides a motor having great capacity within small limits of space.

To stop, start, and control the application of power from the motor to the record rotating mechanism there is provided a brake or stop disk 230 (Figs. 6, 13 and 17) secured to the brake shaft 231 and driven from the motor driving shaft 176 by means of the intermeshing gears 232 and 233. The brake shaft is provided with a weight governor having the weights 234 which control the position of the governing disk 235, the latter adapted to move against the fixed brake shoe 236 if the speed exceeds a predetermined limit, thereby slowing down the motor. The brake shoe 236 is mounted upon a bell crank lever 237 and may be adjusted by means of the adjusting screw 238 to adjust the speed limit.

The motor is started and stopped by engagement with the brake disk 230 by the brake shoe 240 carried by the stop lever 241, which latter is pivoted at 242. The stop lever carries an armature operatively related to the stop magnet 243 and the releasing magnet 244, so that when the former is energized the brake is applied and the motor stopped, and when the latter is energized the motor is free to drive the machine. A spring-pressed bevel-ended detent pin 245 is pressed upward into the path of the lever 241 to engage one side or the other thereof according to the position of the lever, so that the brake is held in its on or off position irrespective of the continued energization of the magnet and until again thrown to its opposite position.

The machine is started, stopped, the carrier shifted and any one or more selected records automatically played through the electrical control of the releasing magnet 34 and the brake magnets 243 and 244.

Referring to Fig. 9, there is there shown a diagrammatic arrangement of electrical connections. The carrier releasing magnet 34 and the brake releasing magnet 244 are contained in a main starting circuit 250 which also includes the battery 251 or other suitable source of electro-motive force and suitable starting contacts. The circuit is herein closed to start the machine through the battery and the magnets 34 and 244 by the insertion of a coin in either of the coin chutes 252 or 253 (see also Figs. 5 and 11), the first intended for coins for a smaller denomination, such as one cent, and the latter for coins of larger denomination, such as five cents. The purpose of these chutes will be more fully referred to. A coin dropped into the chute 252 bridges the contacts 254 and 255 (see Fig. 9) and a coin dropped into the chute 253 bridges the contacts 256 and 257. The coin passes downward to the coin box 258 (Fig. 5) but closes the circuit 250 for an interval long enough to energize the magnet 34 to release the carrier and energize the magnet 244 to start the motor turning. The two sets of contacts in the two coin chutes are connected in multiple so that a coin in either chute starts the machine.

The carrier when released will continue to turn as previously stated until the selector lever 40 is caused to lift and uncover a locking opening in the locking disk 20. The reproducer being lifted on the initial movement of the carrier as previously described and being returned to its initial position by the feed screw will be lowered automatically at that point by the energization of the lowering magnet 122. To energize the latter magnet, the sound box supporting sleeve 102 carries the contact 259 adapted to touch the fixed contact 260 on the frame of the machine when the stylus has reached the beginning of the sound groove in the record. The contact 259 is connected by a flexible conductor to the magnet 122, and the latter through the wire 261 to the battery 251, the latter in turn being connected through the wire 262 to a ground on the frame of the machine. The stylus being thus automatically lowered, when it reaches its initial position, the reproduction of the record immediately begins.

The movement of the carrier is effected quickly as compared with the return movement of the sound box, so that preferably the selected record will be in position before the sound box reaches its initial position, even though the carrier has to be turned through substantially its entire length.

When the reproduction is finished and the sound box reaches the opposite end of the record, the machine may be either stopped by energizing the brake applying magnet 243 or the carrier may be released for a continuation of the reproduction either of the next successive record or some other selected record according to the position of the selector lever 40. The lever 40 which is fulcrumed at 270 on the machine frame (see Fig. 5) is jointed at one end to the upright slide rod 271, the latter carrying near its upper end the contact 272 which is connected through the conductor 273 to the brake applying magnet 243. The sound box carrying sleeve 102 (Fig. 6) is provided with the contact 274 adapted to touch the contact 272 when the sound box has reached the end of the record provided the selector lever is elevated. The contact 274 is connected through the flexible conductor 275 to the battery 251 and the latter to the magnet 243 so that the closure of the circuit at the contacts 272 and 274 energizes the brake applying magnet 243 and stops the motor.

In the circuit 273 between the contact 272 and the magnet 243 there are interposed the contacts 276 comprising a fixed and movable contact normally open but adapted to be closed by an adjustable screw 277 carried by the end of the brake lever 241. When the brake is released the contacts 276 are closed and the brake magnet 243 in readiness to be energized. When the brake lever has been thrown by the energization of the magnet 243, however, and the machine stopped, the stopping circuit is opened at 276, preventing waste of current.

If, when the sound box reaches the end of the record, the selector lever is depressed so that the selector contact 272 is withdrawn from the path of the contact 274, the latter is caused to strike the stationary contact 278, which latter is connected by the conductor 279 with the starting circuit 250, so that the meeting of these two contacts effects the same result as the insertion of a coin and energizes the releasing magnet 34 and the brake releasing magnet 244.

With the selector contact elevated, therefore, all further movement of the machine is stopped when the stylus reaches the end of the sound groove until such a coin is subsequently dropped into the chute. On the other hand, if the selector contact is depressed when the stylus reaches the end of the record, the motor continues to turn, the carrier is released, the sound box returned to its initial position and the carrier moved to bring successive records into position until the selected record is reached.

Referring now to the selecting mechanism, means are provided whereby not only may any desired record be selected automatically in response to the movement of a controller or director, but, following the selection of one record, other records may be automatically played in succession from either adjacent or different parts of the carrier. This is accomplished by a suitable control of the selecting lever 40. Referring more particularly to Figs. 5, 6, 10, 11 and 12, the selector lever has its rear end normally thrown down to cover the locking apertures in the locking disk 20 by means of the spring 280, but is lifted at appropriate times by controlling devices at the opposite or front end of the lever.

Referring to Figs. 5 and 10 on the front of the machine casing there is pivoted a controller or record designating lever 281 having the handle 282 and carrying in its end the spring-pressed positioning pin 283. The latter is adapted to register with members of a series of notches 284 which are arranged opposite certain numerical designations, 1, 2, 3, 4, etc., referring to different records on the carrier. The lever may be turned to designate any particular record, for example, record No. 4, the positioning pin 283 snapping into the notch thereat and temporarily holding the lever in the position represented in Fig. 10. Such movement of the lever turns the short shaft 285 on which it is mounted (Fig. 5) giving a corresponding movement to the selector arm 286 within the casing. The latter is forked at its upper end to engage a pin 287 and imparts movement to a sliding stop bar 288 which has a sliding support in the lever 40. To support both ends of the slide bar, the lever 40 has the branched portion 289 (see Fig. 6) while the end of the main lever portion 40 is continued in a right-angled bend 290 and terminates in a short projection 291 which serves to lock the designating lever as will be more fully described.

The position of the controlling lever 40 is controlled by engagement with an upright stop member 292 on the stop bar 288 of controlling devices carried by the selector or pattern drum 293. This drum is provided on its circumference with as many pairs of selector pins 294 arranged in sets lengthwise the selector as there are records in the carrier, the number in each set arranged about the periphery being also equal to the number of records.

For a purpose to be described the selector pins are some short and some long and for purposes, also to be described, the stop member is of a peculiar construction (see Figs. 6ᵇ and 6ᶜ) and the pins different in configuration (as shown in Figs. 4ᵃ, 4ᵇ, 4ᶜ and 4ᵈ). The pins are in the form of pegs which may be inserted in suitable holes provided in the face of the drum so that they may be arranged in any predetermined order and position.

Without at present referring to the difference in shape or configuration of the pins, the operation is as follows: The movement of the designating lever to designate any particular record brings the stop member 292 lengthwise the drum in line with the row or set of stop pins corresponding to that record. For example, if the designating lever is moved to designate record No. 5 the pin comes into registration with the fifth row of selector pins. The selector drum 293 is turned in synchronism with the movements of the carrier so that, when any given record is in playing position, the selector pin corresponding to that record will be immediately over the stop member 292. That is to say, with the selector lever moved to select record No. 5, the selector pins in the fifth row on the cylinder will pass in succession over the stop pin 292 as the corresponding records pass through the playing position, the pin corresponding to record No. 5 being brought into operative relation to the stop member when that record is reached. Any suitable means may be employed for this purpose, but herein the drum is mounted upon a drum shaft 296 on which is also fixed the gear 297 (Fig. 6), the latter meshing with the large intermediate gear 298 driven from the small pinion 299 on the carrier sprocket wheel shaft 5.

The particular sequence of movements which follow the selection of the various records are predetermined by the prior arrangement of the selector pins upon the pattern drum, these being set in any suitable position, and the machine then locked up.

If it is desired that any given record, when selected, should be played and the machine then stopped, a long selector pin corresponding to that record on the pattern drum is set to project from the periphery of the drum so that when it engages the stop member 292 it will depress the bar 288 and raise the opposite end of the selector lever 40 to the fullest extent. Accordingly, with the machine set into operation by the insertion of a coin, the selector lever will be elevated as soon as that particular record approaches playing position, not only causing the carrier to be fixed at that point, but raising the cylinder stop contact 272 so that, when the reproducer reaches the end of its run, it will apply the brake and stop the machine.

In such a case all the other selector pins in the corresponding circumferential row are removed from the cylinder so that in all other positions thereof the stop member 292 is held pressed against the circumference of the drum 297, depressing the active end of the selector lever and preventing the locking of the carrier as successive records are brought into playing position, until the particular selected record is reached.

If it is desired that the movement of the selector lever to any given position should be automatically followed not only by the playing of the corresponding record, but also by the playing of the successive record or records, then a short selector pin corresponding to that record is inserted to project above the surface of the drum. This, when brought into engagement with the stop member 292, causes a partial elevation only of the active end of the selector lever sufficient to expose the locking apertures in the locking disk 20, so that the carrier will be stopped at that point, but insufficient to lift the selector stop contact 272 into the path of the contact 274, so that, when the record is played, instead of the machine being stopped, the carrier will be again released and the motor continue to turn until the record next in succession to be played is reached, whereupon the carrier will be stopped and the same operation repeated, the last record to be played being represented on the pattern roll by a long pin.

For example, if it is desired to play record No. 2 and to follow it with record No. 3 and then with record No. 5, the short pins corresponding to records Nos. 2 and 3 in the second circumferential row of selector pins and the long pin corresponding to record No. 5 will be set to project from the drum, all other pins in that set being removed. With that adjustment, the machine, when started, will play record No. 2 and automatically continue to play record No. 3 and then record No. 5, whereupon it will automatically stop.

This selective control over the records permits the machine to be adjusted so that records having some connection each with the other may be automatically played in succession, or a number of short records may be combined in a single reproduction, or several records such as are played separately for the payment of a coin of low value can be played in succession and automatically upon the payment of a coin of high value.

In order that the machine will always play any predetermined series of records as planned, means are provided whereby the reproduction will always commence with the record which is intended to be the initial record, irrespective of the particular stage at which the machine was last stopped.

For example, in the case supposed where it is desired to play records 2, 3 and then record No. 5, if the machine had been previously stopped with record No. 4 in operative position, then on moving the controller lever to designate the aforesaid series of three records and setting the machine into operation the reproduction would start and stop with record No. 5 unless some provision were made to avoid this.

To this end I have provided distinctive types of pins intended for the initial reproduction, the final reproduction and intermediate reproduction and have constructed the stop member so that it is intended to coöperate with the particular form of pins employed.

Referring to Figs. 6$^b$ and 6$^c$, the stop member instead of being a rigid projecting pin or other piece, comprises two pivoted pins 292$^x$ and 292$^y$ which pins are normally held in contact as represented in Fig. 6$^b$ by the springs 292$^z$. These pins or ears are beveled at their contacting edges on the side where engaged by the pattern drum pins and when suitably engaged thereby may be wedged apart, in which position they are retained by the springs 292$^z$. Any tendency to force the pins toward each other, however, results in their snapping together into the position shown so that the pins may be readily snapped apart or together.

The pattern drum pin which is utilized to initiate the reproduction of a series of records is of the form shown at 294$^a$ in Fig. 4$^a$, this being a short pin and having a wedge-shaped head which on engaging with the ears 292$^x$ and 292$^y$ first wedges the same apart and then depresses them, the ears resting upon the topmost flattened face of the pin when the record is locked and played.

When the record has been played, the machine continues to turn and if the next designated record is to be succeeded by others its position is marked by a pin like that at 294$^b$ shown in Fig. 4$^b$. This pin is of U-shaped cross section but with beveled inclined sides so that the spread or opened ears engage the wedge-shaped sides and are depressed thereby. This pin is also a short pin. All intermediate records of a series are designated by this type of pin.

The final record of a series to be played is designated by a pin of the type shown at 294$^d$ in Fig. 4$^d$, this pin being a long pin to terminate the reproduction and being of similar shape to the pin 294$^b$ except as each side is provided with an arch-like extension which, when the machine is next operated, moves the ears toward each other and causes them to snap back to their initial position.

The result is that at the final termination of the reproduction of any record or series of records, the ears are left in contact with each other. On the other hand, after the reproduction of a series of records has been commenced the ears are spread apart and remain so until the reproduction is terminated. The result is that the reproduction of a series of records cannot be initiated by an intermediate pin 294$^b$ or a terminating pin 294$^d$ for the closed-in ears readily pass between the sides of the pins without depression thereby. These reproductions can only be initiated by a pin having the configuration shown in 294$^a$.

If it is desired to play a single record only and then stop the machine, a pin 294$^e$ like that shown in Fig. 4$^e$ is utilized to designate the record, such pin being a long pin and acting to depress the closed-in ears, leaving their relation unaffected. If a record is to be skipped, its pin is, of course, removed, resulting in the carrier being shifted past that particular position.

In order to indicate to the user of the machine the particular record for which the carrier is set at any given time and also to indicate a proper response of the carrier to any given selection, suitable indicating means are provided which automatically follow the movements of the carrier. While any suitable mechanism may be used for this purpose, herein directly over the numerical designations of the records and behind the glass wall 300 there is caused to move a pointer 301 which indicates the particular record in playing position. This pointer (Fig. 5) is carried by the swinging indicator segment 302, the latter fulcrumed to swing about the selector shaft 285 and turned in response to movements of the selector drum by mechanism as follows:

On the end of the selector drum shaft 296, (Fig. 6) there is provided the edge cam 303 against which bears the cam roll 304 carried by the upright lever arm 305 (Fig. 11) pivoted at 306 on the frame. The lower end of the lever is connected by the link 307 to the indicator segment so that as the cam is turned with the drum, the segment swings through a corresponding angle and moves the indicator pointer to designate the record then in playing position. The cam roll is held against the cam by the spring 308, one end of which is fixed to the frame and the opposite end connected to the segment to draw the same toward the position of record No. 1.

Preferably means are employed to lock the designating lever against accidental or intentional displacement at all times when the machine is in automatic operation except when the carrier is locked. To this end the projecting or locking end 291 of the selector lever is caused to register with a series of slots 309 (Fig. 11) formed in a sliding locking plate 310. The plate is given movement by the designating lever through means of a pin 312 which passes through an arc-shaped slot 313 in the case and works in a vertical slot 314 in the locking plate. When the designating lever is moved into position to select or designate any record one of the notches 309 is brought immediately over the locking projection 291 so that as soon as the carrier starts moving and the drum turning, the selector lever moves to lift the projection into the notch and lock the locking plate and designating lever against further movement until such time as a long selector pin on the drum depresses the selector lever to the fullest extent and the carrier becomes locked.

In some instances where the machine is not employed in connection with prepayment devices, it is desirable to make provision for the continuous playing of successive records. For this purpose provision is herein made whereby the forward end of the selector lever can be depressed for any desired period irrespective of the position of the designating lever or the arrangement of the pins in the selector drum. Herein this is accomplished by the provision of a vertically sliding, arc-shaped locking plate 320 (Figs. 5 and 11) carried by the indicator segment and overlying the projection 291 on the selector lever. Such plate is normally drawn up by springs 321 out of engagement with the selector lever, but may be depressed and held depressed by means of the latch 322 which (Fig. 5) has a shoulder 323 adapted to catch on the edge 324 of the indicator segment to hold the selector lever down. A spring 325 holds the latch against the edge 324 but it may be released at will. Access to the latch is normally prevented by the closure 326 in the casing which will customarily be locked up, but the latch may be reached by authorized persons through the closure to provide for continuous playing of records in succession without the necessity of further manipulation of the machine.

For the purposes of trial or inspection, or for the use of the machine apart from the prepayment devices, means may be also provided for starting the machine into operation irrespective of the coin-controlled contacts. Such means are shown diagrammatically in Fig. 9 as comprising the button or switch 330 arranged in a branch circuit 331 of the starting circuit 250 so that by closing the switch the machine can be started in all respects the same as by the insertion of a coin. Such button may be provided in any suitable part of the machine, or if used in connection with prepayment devices may be reached through the closure 326.

While the machine is intended to reproduce certain records of the prepayment of a coin of one value, and other records through the prepayment of a coin of higher value so that two or more prepayment receptacles are present, means are preferably provided whereby the designation of any particular record or records closes all but the prepayment receptacle which is suitable or appropriate to receive prepayment for the record or records selected.

Referring to the illustrated form of machine and particularly to Figs. 5 and 11 where two coin chutes are employed, 252 for the coin of lower value, as for example, one cent, and the other, 253, for a coin of higher value, as for example five cents, a controlling plate or shutter 340 is provided pivoted at 341. Such plate has two positions in one of which (the upper position shown in full lines) the mouth of the five-cent chute is closed while the mouth of the one-cent chute is opened by means of the slot 342 in the plate. In the lower position (shown in dotted lines) the mouth of the one-cent chute is closed and the mouth of the five-cent chute uncovered. To position the plate with reference to the selected record or records the same is connected to the downwardly extending link 343 connected at its lower end to the lever arm 344, the latter fulcrumed at 345 to the frame. The link is normally drawn toward a stop pin 346 by a spring 347, but may be held down to the full line position shown to open the one-cent chute through the abutment of the lug or projection 348 carried by the lever against the projecting end of one of the series of pins 349 arranged in the chute controlling disk 350. As many pins are provided as there are records on the carrier and the disk is pinned or otherwise secured to the selector shaft 285 so that, when the designating handle 251 is turned to indicate any particular record, the chute-controlling pin for that record is brought immediately over the lug 348. The pins are each provided with a pair of circumferential notches (Fig. 5) adapted to be engaged by a short spring finger 351 fastened to the face of the disk so that the pin can be snapped and held either in the position shown or in a position where the head does not project from the inner face of the disk and does not therefore offer any opposition to the upward movement of the lug 348.

If, therefore, the pins are prearranged so that those corresponding to the records of lower valuation project into the path of the lug while those corresponding to records of the higher valuation do not project into the path of the lug, the movement of the selector arm to any given position will simultaneously position the chute controller to expose the appropriate coin chute for prepayment.

Referring now more particularly to the reproducing mechanism, it often becomes desirable to shift, change, or adjust parts of the reproducing mechanism, as for example, the diaphragm or other reproducing elements, after playing one record and before playing another and with reference to the particular requirements or characteristics of the individual records so that each record may be reproduced under the best conditions and with the highest efficiency. Herein, I have provided means whereby prior to the playing of any given record, parts of the sound reproducing apparatus may be automatically adjusted with particular reference to the record about to be played.

Referring to the drawings and more particularly to Figs. 6, 8 and 12, the sound box arm 101 has a prolongation 360 which carries an upright stud 361, the latter being provided with the ball bearing 362 adapted to travel along the fixed rail 363 on the machine. This stud provides a swivel support for adjusting diaphragm frame 364 which latter is provided with a plurality of diaphragms, herein three in number, 365, 366, 367, which may be brought successively into operative position within the sound box, the middle diaphragm 366 being herein shown in that position. These diaphragms are differently tuned or pitched so that while one is best for a record having certain characteristics, another is better fitted for a different characteristic of another record, and so on. In connection with the multiple diaphragm holder, means are provided whereby that diaphragm best fitted for the record about to be played is automatically moved into operative position in the sound box. Herein, for such purposes the diaphragm arm 364 carries an armature 368 which is adapted to span but not quite touch the poles of any two adjacent magnets of the set of four, 369, 370, 371 and 372. These magnets are fixed on the prolongation 360 of the reproducer arm and alternate in polarity so that the energization of any two adjacent magnets attracts the armature and swings the corresponding diaphragm into position. A yieldable spring-pressed positioning pin 373 in one of three perforations of the swinging arm serves to maintain the arm in the position to which it is adjusted.

To control individually the position of the diaphragm arm, each record retainer (Fig. 3) is provided with a pivoted contact clip 374 having an outwardly projecting end and so located that just prior to the record reaching a playing position the clip is caused to strike one of the three sets of contacts 375, 376, 377, fixed upon the rail 146 so that a suitable controlling circuit is thereby closed. Each contact pair comprises an upper and lower contact as represented diagrammatically in Fig. 12, one pole of the battery being connected to magnets 369 and 371 in multiple and the other to the magnets 370 and 372 in multiple. The remaining terminal of the magnet 369 is connected to one contact of the pair 375, the other member of the pair being connected to the terminal of magnet 370, which latter is also connected to one of the contacts 376. The remaining contact of the pair 376 is connected in multiple with one of the contacts 377 to the terminal of the magnet 371, while the remaining contact of the pair 377 is connected to the terminal of the magnet 372.

It therefore follows that if the adjustable contact 374 on any given record retainer is set to close the contacts 375, the magnets 369 and 370 will be energized and the diaphragm 365 placed in operative position. If a record retainer approaches with the clip adjusted to close the contacts 376, the diaphragm 366 will be operatively positioned, or if the contacts 377, then the diaphragm 367.

By adjusting the clip 374 on the individual retainers with reference to the particular record carried by each, such record may be played by means of the diaphragm selected particularly with reference to that individual record.

Other alterations or adjustments in the reproducing parts having reference to the individual records may be automatically employed, and I have herein also shown means (Fig. 5ª) for adjustably moving a throat 380 in the sound box toward or from the diaphragm so that the sound orifice is located more or less remote from the diaphragm, thereby varying the quality of the tone. The throat 380 is in the form of a tube adapted to be moved axially within the tubular casing of the sound box by the arm 381 carrying the armature 382, the latter being operatively related to the three magnets 384, 385, 386 (Figs. 5ª and 6) arranged at different heights so that as one or the other magnets is energized the vertical position of the arm 381 is shifted and the throat thereby raised or lowered. The selected energization of the magnets gives three positions to the arm to suit three different classes of records, but obviously means may also be employed for adjusting it to still other positions or otherwise changing the configuration of the sound passages or the relation of the sound box parts.

To selectively energize the magnets with reference to the characteristics of the individual records, a third pivoted contact clip 387 is employed upon each retainer which may be adjusted like the clip 374 operatively to engage pairs of contacts 388, 389 and 390 carried by the fixed rail 146. Each pair comprises an upper contact connected to one of the three magnets and a lower contact, the latter connected to a battery, the opposite pole of which is connected in multiple to the remaining terminals of the said magnets.

It may sometimes be desired to play records of different length or other dimensions than those for which the disclosed machine is actually constructed. In order to render this possible, I have herein provided adapting means whereby records shorter than those for which the machine is constructed are utilized.

Referring to Fig. 2, I have therein shown a record 400 which is of lesser length than the record 1, but may, nevertheless, be utilized in the machine which has the record by the application to each end of the record of an adapting device consisting of the annular sheet metal adapter 401, each of sufficient length to compensate for one-half the decreased length of the record and having an end formation so that it can be engaged by the record engaging disks 42 and 44 just as are the records 1. Each adapter is applied to and retained upon its record by means of the interiorly projecting spring expansion means 402, which may be inserted within tubular records and serve to hold the adapter thereon by gripping the inner walls of the shell.

Referring now to the relation of the stylus to the diaphragm, the former is shown at 410 (Fig. 8) carried by the stylus lever 411 which latter has the upright connection 412 passing through the perforated, horizontal bar 413 and has its end in contact with the particular diaphragm which happens to be in operative position but free therefrom so that the diaphragms can be shifted one or another into contact with the connection 412. The stylus lever 411 is pivoted to the tension arm 414, the latter being pivoted to the swiveled block 415 and depressed so as to depress or tension the stylus against the record by means of the coiled spring 416, the latter being positioned between the tension arm 414 and the adjustable abutment 417. The latter is in the form of a flat spring arm adapted to be adjusted by means of the adjustable screw 418 so that the degree of compression of the spring 416 and therefore the tension of the stylus can be varied at will.

If desired means may be employed whereby the stylus, instead of being dropped upon the record at the same spot and lifted from the same place in each record, may be variably lowered and raised, the time of raising or lowering, or both, being automatically selected with reference to the beginning and ending of the record groove in each instance. In the event that long and short records are both employed upon the same carrier or records wherein the length of groove differs materially for different records, such provision eliminates an unnecessarily long wait between the playing of successive records. It also insures the elimination of the prolonged series of noises usually preceding and following the playing of a record due to the stylus engaging with parts of the record surface other than the record groove. Furthermore, where one record is succeeded by a second which serves as a prolongation of the first, the interruption between the two will be reduced to a minimum.

For the purpose of adjusting the engagement of the stylus with the separate records with reference to the beginning and ending of each record groove, I have herein provided a supplemental set of contacts upon the sound box which corresponds to the contacts 259 and 274 and supplemental sets of contacts one for each record retainer which corresponds to the contacts 260, 272, 278. By means of these contacts the playing will be stopped at or approximately at the end of the record groove in each case and commence at or approximately at the beginning of the groove in each case. To lower the sound box at the right point in the case of each record, the sound box is provided with a contact 420 supported by the swinging arm 421, the latter pivoted (see Figs. 5, 6 and 7) at 422 upon a prolongation 360 of the sound box carrying arm.

Such contact is connected in multiple (see Fig. 9) with the contact 259 also carried by the sound box and is adapted to coöperate with the members in a series of contacts 423 adjustably mounted one upon each of the record retainers. Each contact comprises a small spring clip which can be adjustably fastened over the edge of the record retainer at a distance from the edge thereof dependent on the character of the record carried thereby. When the sound box is lifted, as it is when undergoing its return movement, the contact carrying arm 421 slides over the edge of the record container, the contact 423 lying in the path of the contact 420. When the two meet the magnet 122 is energized, the latch 120 thrown and the sound box dropped as previously described. The adjusted position of the contact clip 423 obviously determines the point along the sound record where the stylus is lowered. The contacts 423 are connected to the battery by means of the ground wire 262 grounded to the frame of the machine. When the record carrier shifts the contact carrying arm 421 lifts and slides over the edge of the record retainer.

To control the cessation of playing, the sound box is provided with the contact 424 connected in multiple to the stationary contact 278 and the contact 425 connected in multiple with the selector controlled contact 272. These coöperate (see Figs. 8 and 9) respectively with the adjustable contact clips 426 and 427 adjustably secured upon the edge of the record retainer opposite the edge to which the contact 423 is fastened and near the opposite end of the retainer so as to touch their respective contacts 424 or 425 as the case may be when the stylus is at the end of the record groove. When it is desired that the stylus shall not travel for the full extent permitted by the contacts 272 and 278 the record retainer is equipped with one or the other contacts 426 and 427. If it is desired that the machine shall stop after the record has been played its retainer is provided with one of the contacts 427 so positioned that it will touch the contact 425 on the sound box when the stylus has reached the end of the record groove. If, however, it is desired that the playing of the record shall be followed by the playing of another record before the machine stops its retainer is provided with one of the contacts 426 so positioned that it will touch the contact 424 on the sound box when the stylus has reached the end of the record groove. The provision of the contact 427 stops the machine and applies the brake, while the provision of the contact 426 causes the carrier to be shifted for the positioning of another record immediately on the cessation of playing. Preferably the contact 424 is shorter than the contact 425 so that it will not touch or interfere with the contact 427 if the latter be present.

It will of course be understood that many features of my invention herein described are applicable to types of sound reproducing or sound recording machines other than the one which is here taken for purposes of illustration, and that such features of my invention either modified or as described, may be applied to such machines without reference to the presence or absence of the remaining features of said invention. It will also be understood that while I have described with considerable detail for illustrative purposes one practical embodiment of my invention, the same is not limited to the details described, or the form, relation, or construction of parts, but that many and wide modifications may be made therein without departing from the spirit of my invention.

Claims:

1. A multiple record phonograph having a record carrier comprising flexible carrying means having a plurality of record retainers, each being adapted to hold a cylindrical record resting loosely therein.

2. A multiple record phonograph having a record carrier, a carrier turning shaft, an apertured locking disk carried thereby, a bolt for engaging the locking disk, and automatic means for controlling said bolt to cause it to enter any given aperture.

3. In a multiple record phonograph the combination with a carrier having a plurality of positions, locking means for locking the carrier in each successive position to play the records in succession and means for rendering said locking means inoperative for any given position to play said records out of their fixed order.

4. In a multiple record phonograph, the combination with a carrier, carrier locking means and means to obstruct the carrier locking means.

5. A multiple record phonograph comprising a record carrier for carrying a plurality of cylindrical records, means for bringing the records successively into approximate playing position in the orbit of said carrier, and means for freeing a record from the carrier by moving the carrier.

6. A multiple record phonograph having a record carrier for carrying a plurality of cylindrical records, means for bringing the records successively into playing position, and means for distorting the carrier to release the records so brought into playing position.

7. A multiple record phonograph having a record carrier, and means for simultaneously lifting a record from the carrier and moving the carrier to further relieve the record.

8. A multiple record phonograph having a record carrier and means for freeing a record from the carrier including means engaging the carrier.

9. A multiple record phonograph having a record carrier and means for freeing a record from the carrier including means engaging and moving the carrier.

10. A multiple record phonograph having a record carrier, and means to engage the ends of a given record and free the same from the carrier and to simultaneously engage and move the carrier.

11. In a multiple record phonograph, the combination with a multiple record carrier, means for bringing the carrier into operative position, and means for simultaneously lifting the record and depressing the carrier.

12. A multiple record phonograph having a flexible carrier, a sprocket driving wheel provided with depressions, and gripping means to force the carrier into said depressions.

13. In a multiple record phonograph, the combination with a carrier, locking means for locking the carrier, means for engaging the carrier to move the same away from the record in playing position, and means to disengage the carrier simultaneously with the unlocking of the same.

14. In a multiple record phonograph, the combination with means for holding a plurality of records, sound reproducing means, means for causing the traverse of said sound reproducing means relatively to said records in succession, and means for automatically varying the speed of traverse with reference to the particular record played.

15. In a phonograph, the combination with a record holder, of sound reproducing means, means for causing relative traverse between the record and the sound reproducing means, and means controlled by the record holder for automatically changing the speed of traverse.

16. In a multiple record phonograph, the combination with means for holding a plurality of records, reproducing means including a stylus, means to produce travel thereof, and means for automatically changing the speed of stylus travel to suit the requirements of different records.

17. A multiple record phonograph having a plurality of records and means for presenting them in succession to the reproducing mechanism, and means for predeterminately skipping a record.

18. A multiple record phonograph having a plurality of records, reproducing mechanism, and means for automatically bringing said reproducing mechanism and records into coöperative relation to play records in succession in any given predetermined order.

19. In a multiple record phonograph, the combination with means for holding a series of records, of means for predeterminately controlling the machine to cause it to play a plurality of selected records irrespective of their order in the holder and means to stop the machine on the completion of a selected record.

20. In a multiple record phonograph, the combination with a record carrier, means for advancing the record carrier step by step to bring successive records in playing position, means for reproducing a record thus brought into position, and automatic selector means to cause the passage of the carrier through successive steps, prior to the reproduction of a record, thereby to select the predetermined record for reproduction.

21. A multiple record phonograph having a plurality of records, reproducing mechanism, a controller adjustable to positions corresponding to predetermined selections of records to be reproduced, and means for automatically causing the reproduction of certain predetermined records only in response to a movement of the controller.

22. A multiple record phonograph having a plurality of records, motor-driven record-shifting means to bring them successively into operative position, a controller, and means controlling the shifting mechanism to render the same responsive to the position of the controller and bringing a selected record into operative position.

23. In a multiple record phonograph, the combination with a record carrier, motor driven means for moving the carrier to shift the records, locking means and hand operated selecting means arranged to inhibit action of said locking means except with reference to a selected record.

24. A multiple record phonograph having a record carrier, a pattern member, reproducing means, and means through said pattern member for controlling the order of reproduction of said records.

25. In a multiple record phonograph, the combination with means for holding a plurality of records, automatic means for presenting them to reproducing mechanism, said phonograph being capable of playing the records continuously in succession and of playing them in predetermined order and selection, and means for determining the method of operation of the phonograph.

26. In a multiple record phonograph, the combination with means for holding a plurality of records, reproducing mechanisms of different character, and means for shifting the reproducing mechanism in accordance with the characteristics of the individual record to be played upon the presentation thereof.

27. In a multiple record phonograph, the combination with reproducing mechanism having a plurality of diaphragms, means for holding a plurality of records, and means for automatically shifting the diaphragms dependent on the record to be played.

28. In a multiple record phonograph, the combination with means for presenting to the reproducing mechanism any one of a plurality of records, reproducing means adjustable as to the acoustic character of the reproduction and automatic means for adjusting the reproducing mechanism to harmonize the character of the reproduction with the character of the matter played.

29. In a multiple record phonograph, the combination with means for presenting in succession a plurality of records to the reproducing mechanism, reproducing mechanism including an adjustable throat, and means controlled by the record presenting mechanism for automatically adjusting the throat dependent on the characteristics of the individual record to be played.

30. In a multiple record phonograph, the combination with means for holding a plurality of records, selector means for selecting at one operation any two or more records to be automatically played successively.

31. In a multiple record phonograph for playing a series of records, the combination with means for selecting in advance certain members of the series independent of their original serial position in the machine, of means for automatically playing said selected members in succession.

32. A multiple record sound-reproducing machine comprising, in combination, a carrier having record holders, adjustable members on said holders and mechanism sensitive to the adjustment of said members to vary the acoustic qualities of the reproduction.

33. A multiple record sound-reproducing machine comprising, in combination, a carrier having record holders, adjustable contact members on said holders, electric circuits arranged for closure by said contacts in certain conditions of adjustment and devices controlled by the energy of said circuits for varying the acoustic qualities of the reproduction.

34. A multiple record sound-reproducing machine comprising, in combination, a record carrier movable to present records for reproduction, a lock to hold said carrier in position with a record so presented comprising interengaging male and female members and a device adjustable for interposition between said members to prevent the operation of said lock.

35. A multiple record sound-reproducing machine comprising, in combination, a record carrier movable to present records for reproduction, a lock to hold said carrier in position with a record so presented comprising interengaging male and female members and a device adjustable for interposition between said members to prevent the operation of said lock and a pattern drum controlling the operation of said device.

36. In a device of the class described a selector, controlling mechanism comprising a tappet the depression of which actuates the selector, said tappet being formed in two parts having closed and spread positions, and a pattern member for actuating said tappet provided with combinations of the following tappet depressing members:—a series opening member adapted to move said parts to spread position, an intermediate member channeled to depress said tappet in spread condition and pass it in closed condition, and a series-closing member also acting to depress said tappet in spaced condition and pass it in closed condition and further acting to return the parts to closed condition.

37. In a device of the class described a selector, controlling mechanism comprising a tappet the depression of which actuates the selector, said tappet being formed in two parts having closed and spread positions, and a pattern member for actuating said tappet provided with combinations of the following tappet depressing members:—a series-opening member adapted to move said parts to spread position, an intermediate member channeled to depress said tappet in spread condition and pass it in closed condition, and a series closing member also acting to depress said tappet in spaced condition and pass it in closed condition and further acting to return the parts to closed condition, and an individual selector member actuating said tappet in closed condition without altering the same.

In testimony whereof, I have signed my name to this specification in the presence of two subscribing witnesses.

GEORGE H. UNDERHILL.

Witnesses:
THOMAS B. BOOTH,
ROBERT H. KAMMLER.